United States Patent
Cretella

(10) Patent No.: US 12,451,680 B2
(45) Date of Patent: Oct. 21, 2025

(54) LOW PROFILE OUTDOOR PEDESTAL

(71) Applicant: Hubbell Incorporated, Shelton, CT (US)

(72) Inventor: Joseph Nicholas Cretella, Ansonia, CT (US)

(73) Assignee: Hubbell Incorporated, Shelton, CT (US)

( * ) Notice: Subject to any disclaimer, the term of this patent is extended or adjusted under 35 U.S.C. 154(b) by 146 days.

(21) Appl. No.: 17/897,366

(22) Filed: Aug. 29, 2022

(65) Prior Publication Data

US 2023/0061786 A1 Mar. 2, 2023

Related U.S. Application Data

(60) Provisional application No. 63/238,341, filed on Aug. 30, 2021.

(51) Int. Cl.
*H02G 3/14* (2006.01)
*H02G 3/08* (2006.01)
*H02G 3/12* (2006.01)
*H02G 3/18* (2006.01)

(52) U.S. Cl.
CPC .............. *H02G 3/14* (2013.01); *H02G 3/081* (2013.01)

(58) Field of Classification Search
CPC .......... H02G 3/14; H02G 3/081; H02G 3/121; H02G 3/18; H02G 3/088
See application file for complete search history.

(56) References Cited

U.S. PATENT DOCUMENTS

| | | | |
|---|---|---|---|
| 5,316,389 A | 5/1994 | Hoffman | |
| 10,797,431 B2 | 10/2020 | Mortun | |
| 11,387,596 B1* | 7/2022 | Smith | H01R 13/5213 |
| 2002/0096350 A1* | 7/2002 | Young | H02G 3/185 |
| | | | 174/67 |
| 2007/0278254 A1 | 12/2007 | Wisniewski | |
| 2009/0218128 A1 | 9/2009 | Carbone et al. | |
| 2014/0131088 A1 | 5/2014 | Drane | |

OTHER PUBLICATIONS

Legrand "Evolution Series 8" Poke-Thru Devices"; Web. May 2021; https://www.legrand.us/wire-and-cable-managemenUpoke-thru-devices.

Spectrum "Vented Collapsible Microwave Cover" ... Web. Mar. 27, 2007; https://www.amazon.com/Tovolo-81-31531-Microwave-Cover-Charcoal/dp/B07GTC4NCV/r ef=sr_1_1 crid=130UC7MJSP7OD &keywords=microwave%2Blid&qid=1668697665&sprefix=mi crowave%2Blid%2Caps%2C131&sr-8-1&th=1.

(Continued)

*Primary Examiner* — Timothy J Thompson
*Assistant Examiner* — Amol H Patel
(74) *Attorney, Agent, or Firm* — Ruggiero McAllister & McMahon LLC

(57) ABSTRACT

A pedestal assembly includes a cover having a half egg shape, dome shape, or hemispheroid shape; a concrete/ground box connected to the cover; and a receptacle housing having one or more pre-receptacles housed in between the cover and concrete/ground box. The cover is movable from a covered position covering the receptacle housing to an uncovered position allowing access to the receptacle housing.

20 Claims, 5 Drawing Sheets

(56) References Cited

OTHER PUBLICATIONS

Rain Block "Seasonal Lighting weatherproof Kit" . Web. May 1, 2018; https://www.amazon.com/Seasonal-Lighting-Weatherproof-Kit-Pack/dp/B07KDY2V9G/ref=s r_1_7?crid=2AHDQMHA3FGZB&keywords=weather+proof+gasket+for+oudoor+electrical+conneclions+rain+block+store&qid=1668700113&sprefix=weather+proof+gasket+for+oudoor+electri cal+connections+rain+block+store%2Caps%2C141&sr-8-7.
Arlington 19.5" Low Profile Enclosure with Built in Cover, Arlington GPD19, Jan. 2021.
Hubbell, Box Adjustable Top, P-31, May 2021.
Pintrest: bhg.com "How to Extend Power Outdoors", Jan. 2021.
Vepotek; Landscape Rock Outdoor Power Extension, SKU: VTOIAC1, 2020.
Pictures of weatherproof box and cover, Jan. 2021.

\* cited by examiner

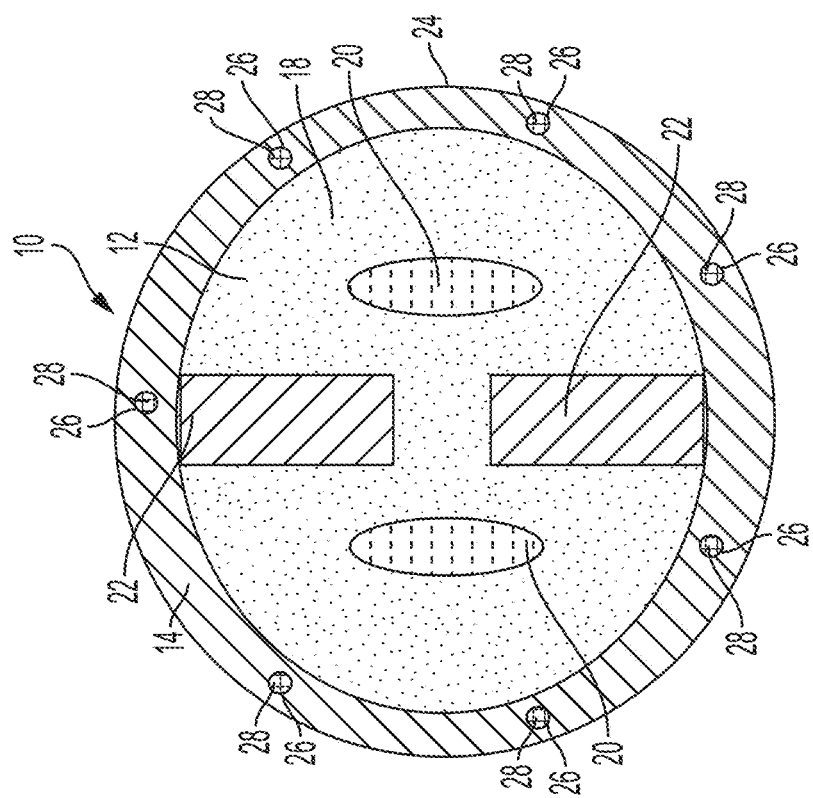
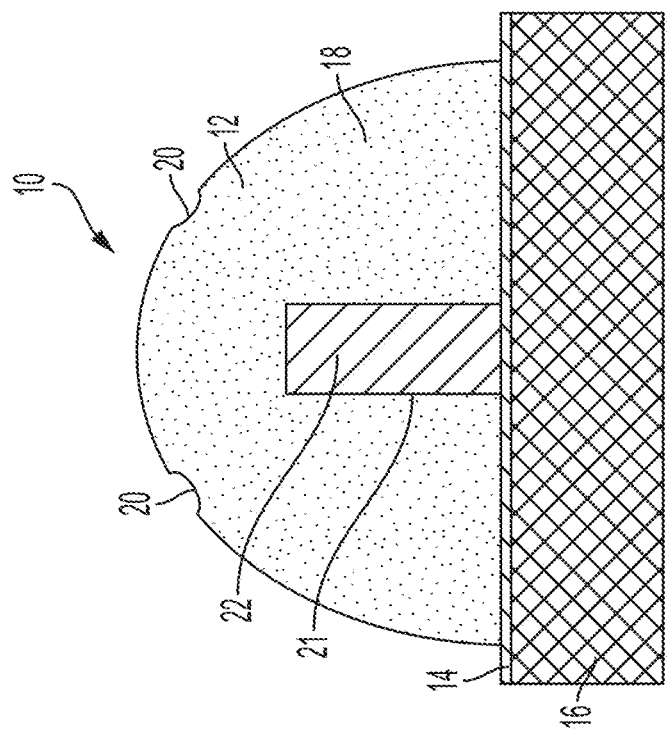

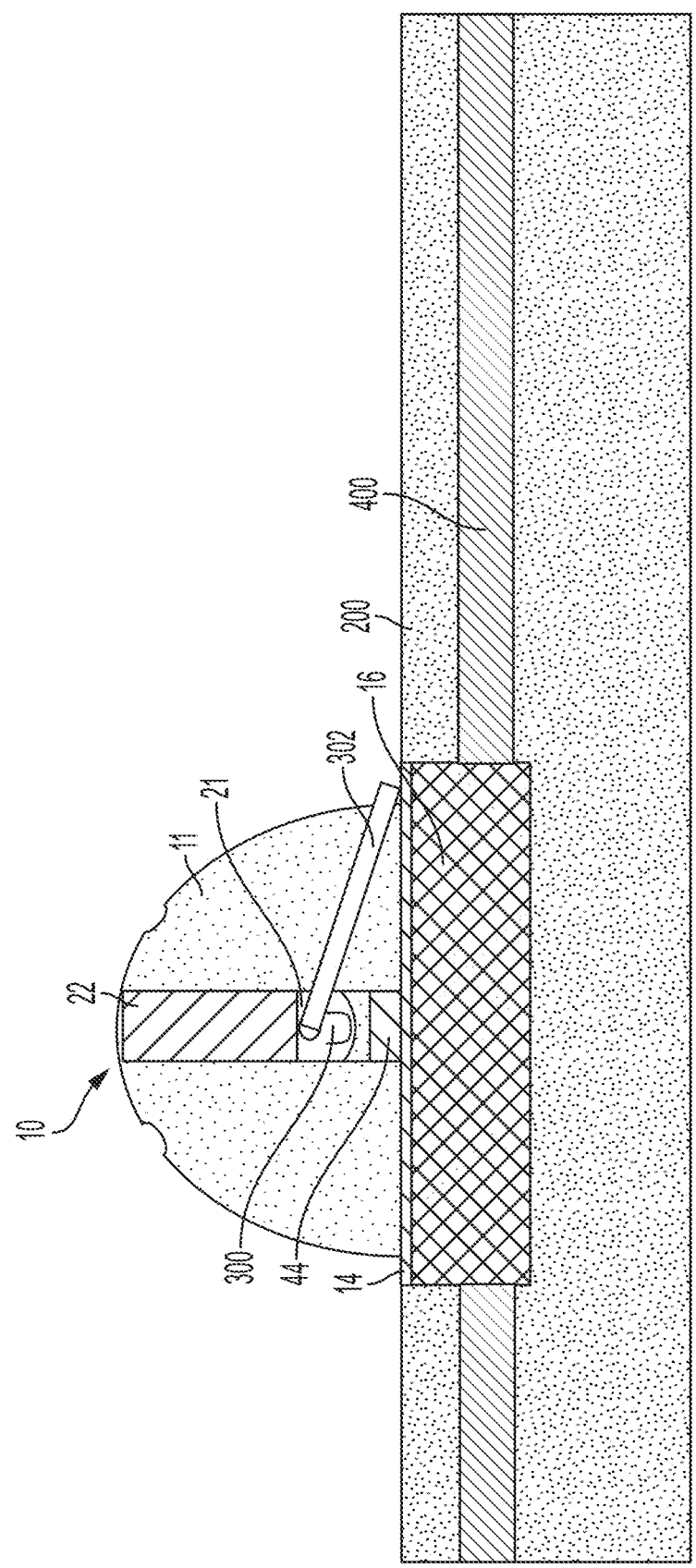

LOW PROFILE OUTDOOR PEDESTAL

CROSS REFERENCE TO RELATED APPLICATIONS

This application claims the benefit of U.S. Provisional Application 63/238,341 filed Aug. 30, 2021, the contents of which are incorporated by reference herein.

BACKGROUND

1. Field of the Invention

The present disclosure is related to outdoor power access. In particular, the present disclosure is related to a low profile outdoor pedestal allowing access to a power source.

2. Description of Related Art

Convenience power cannot be easily accessed on concrete balconies of residential high rise buildings. A bulky weatherproof cover and sometimes a box must be installed on the external wall or post or column. The new trend of glass walls makes a National Electrical Code ("NEC") compliant installation more challenging. The 4 inch to 6 inch concrete pour of these balconies and a drain requirement does not allow design of an in-use weatherproof recessed floorbox. Further, there is a need for ground box installations such as for landscaping and low foot traffic applications that have a low profile.

Accordingly, it has been determined by the present disclosure that there is a continuing need for a device that overcomes, alleviates, and/or mitigates one or more of the aforementioned and other deleterious effects of prior devices.

SUMMARY

The present disclosure provides a pedestal assembly that includes a cover having a half egg shape, dome shape, or hemispheroid shape; a concrete/ground box connected to the cover; and a receptacle housing having one or more pre-receptacles housed in between the cover and concrete/ground box. The cover is movable from a covered position covering the receptacle housing to an uncovered position allowing access to the receptacle housing.

In some embodiments either alone or together with any one or more of the aforementioned and/or after-mentioned embodiments, the cover has a cover body, and the cover body has at least one opening and at least one sliding egress cord door covering the opening.

In some embodiments either alone or together with any one or more of the aforementioned and/or after-mentioned embodiments, the at least one opening is two openings on opposite sides of the cover body, and the at least one sliding egress cord door is two sliding egress cord doors with one sliding egress cord door covering one of the two openings and another sliding egress cord door covering another of the two openings.

In some embodiments either alone or together with any one or more of the aforementioned and/or after-mentioned embodiments, the at least one sliding egress cord door is biased to cover the at least one of opening.

In some embodiments either alone or together with any one or more of the aforementioned and/or after-mentioned embodiments, the cover body has a plurality of grooves that are each sized to be gripped by fingers of a user on a top portion of the cover.

In some embodiments either alone or together with any one or more of the aforementioned and/or after-mentioned embodiments, a cover mounting flange is shaped complimentary to an outer perimeter of the cover that connects around an opening in the concrete/ground box that faces the cover.

In some embodiments either alone or together with any one or more of the aforementioned and/or after-mentioned embodiments, the cover mounting flange has a plurality of holes through a flange body so that each of the plurality of holes receives one of a plurality of fasteners.

In some embodiments either alone or together with any one or more of the aforementioned and/or after-mentioned embodiments, the plurality of fasteners are each 60 degrees apart.

In some embodiments either alone or together with any one or more of the aforementioned and/or after-mentioned embodiments, the cover mounting flange has a skirt that is an integral part of the cover mounting flange, and the skirt has a diameter that is smaller than the cover to align the cover in a covered position.

In some embodiments either alone or together with any one or more of the aforementioned and/or after-mentioned embodiments, the receptacle housing has two back to back fixed pre-receptacles each with wire leads and covered contacts.

In some embodiments either alone or together with any one or more of the aforementioned and/or after-mentioned embodiments, the receptacle housing has two back to back fixed pre-receptacles each with wire leads and covered contacts, and one of the two back to back fixed pre-receptacles is aligned with one of the two openings of the cover and another of the two back to back fixed pre-receptacles is aligned with another of the two openings of the cover.

In some embodiments either alone or together with any one or more of the aforementioned and/or after-mentioned embodiments, an extendable rail system has a receptacle portion attached to the receptacle housing and a cover portion that is attached to the cover, and the receptacle portion has one or more rails that mate with one or more rails of the cover portion that extend from the cover so that the one or more rails of the cover portion are slidable along the one or more rails of the receptacle portion.

In some embodiments either alone or together with any one or more of the aforementioned and/or after-mentioned embodiments, each of the one or more rails of the receptacle portion has a projection or mechanical stop at an end that is opposite the concrete/ground box and each of the one or more rails of the cover portion have a projection or mechanical stop at an end that is free and opposite an end that connects to an interior of the cover so that the mechanical stop of the one or more rails of the receptacle portion abut the projection or mechanical stop of the one or more rails of the cover portion to maintain a connection between the cover and the receptacle housing when the cover is in an uncovered position.

In some embodiments either alone or together with any one or more of the aforementioned and/or after-mentioned embodiments, the concrete/ground box is cast iron.

In some embodiments either alone or together with any one or more of the aforementioned and/or after-mentioned embodiments, the cover is made of materials selected from the group comprising a cast aluminum construction, stainless steel cover construction, and any combinations thereof.

In some embodiments either alone or together with any one or more of the aforementioned and/or after-mentioned embodiments, the two pre-receptacles have a silicone cover such that the covered contacts are covered and water resistant.

In some embodiments either alone or together with any one or more of the aforementioned and/or after-mentioned embodiments, the concrete/ground box has a box top cover assembly for a post pour adjustment having an adapter, an adjustable collar and a cover frame, and the adapter connects to the concrete/ground box, the adjustable collar connects to the adapter and the cover frame connects to the adjustable collar.

In some embodiments either alone or together with any one or more of the aforementioned and/or after-mentioned embodiments, the cover moves from the uncovered position to the covered position by the weight of the cover.

In some embodiments either alone or together with any one or more of the aforementioned and/or after-mentioned embodiments, the at least one sliding egress cord door can be urged against a plug and/or a cord when the cover is in the covered position by the at least one sliding egress cord door being biased to cover the at least one of opening.

In some embodiments either alone or together with any one or more of the aforementioned and/or after-mentioned embodiments, the concrete/ground box connects to an electrical conduit in a slab.

The above-described and other features and advantages of the present disclosure will be appreciated and understood by those skilled in the art from the following detailed description, drawings, and appended claims.

DESCRIPTION OF THE DRAWINGS

FIG. 1 is a front view of a low profile outdoor pedestal assembly having a sliding egress cord door in a closed position and a cover in a covered position.

FIG. 2 is a top view of the low profile outdoor pedestal assembly of FIG. 1.

FIG. 5 is a front view of the low profile outdoor pedestal assembly of FIG. 1 connected to a plug and a cord and having the sliding egress cord door in a partially opened position and the cover in the covered position.

DETAILED DESCRIPTION

Figure 4:
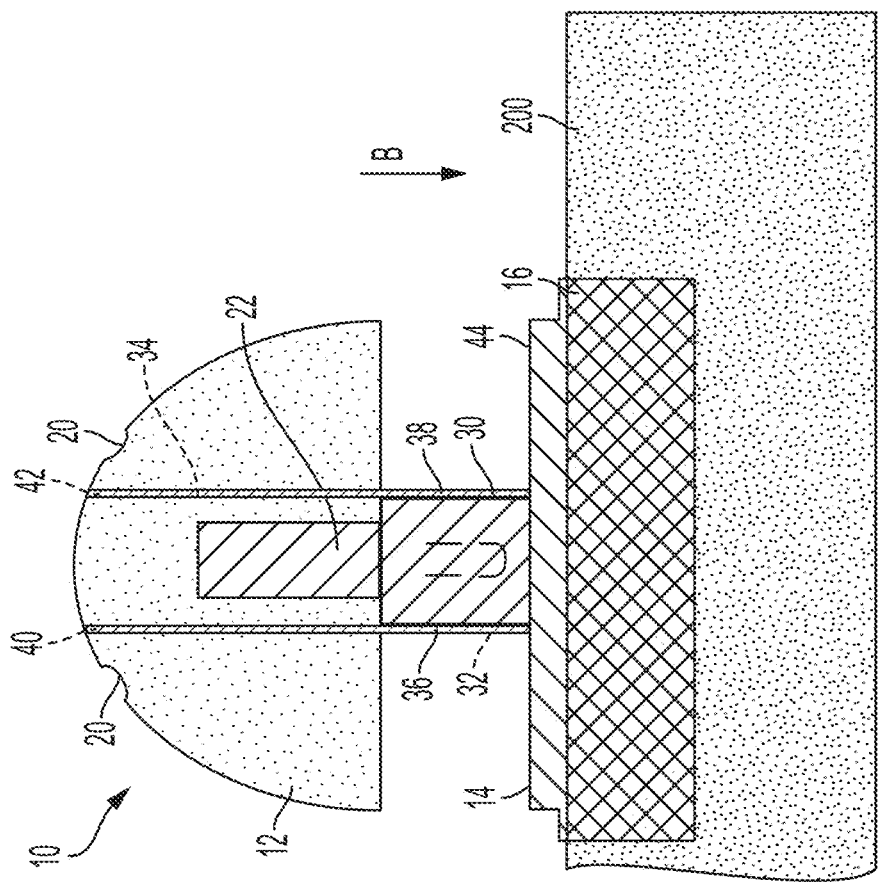
FIG. 4 is a front view of the low profile outdoor pedestal assembly of FIG. 1 in the slab having the sliding egress cord door in the closed position and the cover in an uncovered position.

Referring to the drawings and in particular to FIG. 1, an exemplary embodiment of a low profile outdoor pedestal assembly according to the present disclosure is shown and is generally referred to by reference numeral 10 ("pedestal 10"). Pedestal 10 is a low profile outdoor pedestal allowing access to a power source.

Advantageously, pedestal 10 allows access to convenience power independent of a wall or column. Pedestal 10 is a low profile box that can be installed in an outdoor concrete balcony or patio, for example, with a pour thickness of 4 inches, this is believed to be an industry first. The cover mounting system of pedestal 10 will allow a cover 12 to be mounted in any direction. The unique design of cover 12 will have a high load capacity and be available in multiple finishes. Another advantage is that pedestal 10 can be used for ground box installations such as landscaping where pedestal 10 can be installed in the earth and low foot traffic applications where pedestal 10 can be installed in other flooring or ground.

Pedestal 10 has cover 12, a cover mounting flange 14, and a concrete/ground box 16. Cover 12 has a cover body 18 that is a half egg shape, dome shape, or hemispheroid shape. A hemispheroid is one of the halves into which a plane of symmetry cuts a spheroid that is a sphere-like but not perfectly spherical body. Cover body 18 has grooves 20 on a top portion of cover 12. Grooves 20 are sized to be gripped by fingers of a user. Cover 12 has openings 21 on opposite sides of cover body 18. Cover 12 has a sliding egress cord door 22 to cover each of openings 21. Sliding egress cord door 22 can have a gasket surrounding its perimeter. Alternatively, cover 12 can have one or more than two openings 21 and one or more than two sliding egress cord doors 22. Cover 12 is made of materials, for example, a cast aluminum construction with multiple power paint finishes for all decora requirements or stainless steel cover construction. Cover 12 is a weatherproof cover.

Cover mounting flange 14 is shaped complimentary to an outer perimeter of cover 12, for example, cover mounting flange 14 has a portion that is circular in shape to match a perimeter of a dome shape of cover 12. Cover mounting flange 14 has a flange body 24. Cover mounting flange 14 further has holes 26 through flange body 24. Each of holes 26 receives a fastener 28. Fasteners 28, for example, are mounting screws. Cover mounting flange 14 connects around an opening in concrete/ground box 16 that faces cover 12. Cover mounting flange 14 is made of materials, for example, steel, stainless steel, aluminum or cast aluminum flange. Fasteners 28 are made of materials, for example, painted pregalvanzied steel or stainless steel screws. Fasteners 28 are 60 degrees apart which will allow versatile cover orientation.

Concrete/ground box 16 is shaped complimentary to cover 12 and cover mounting flange 14, for example, concrete/ground box 16 is a cylindrical shape. Concrete/ground box 16 is, for example, cast iron. Concrete/ground box 16 has a ½ inch to 1 inch National Pipe Thread ("NPT") hub.

Figure 3:
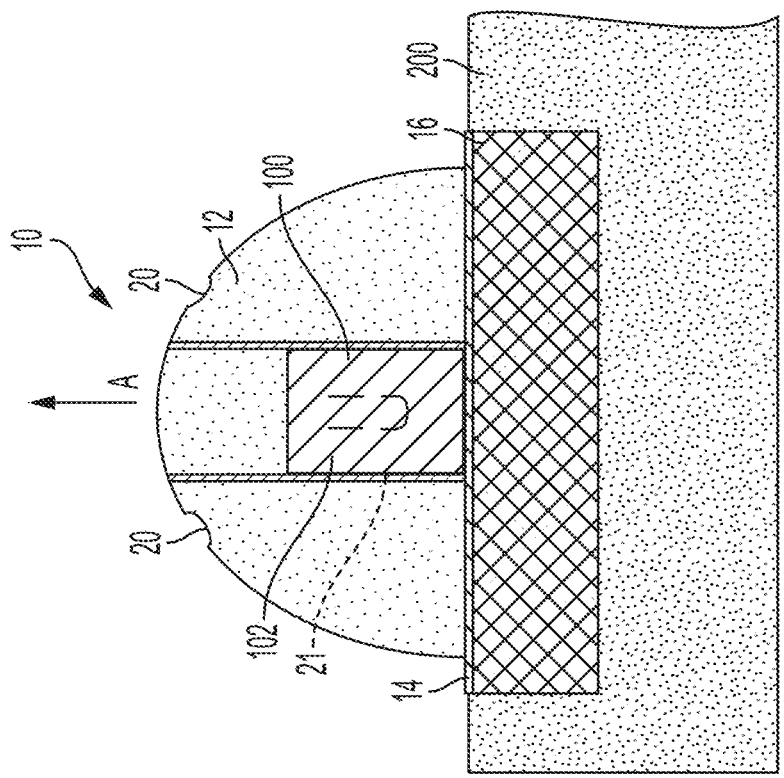
FIG. 3 is a front view of the low profile outdoor pedestal assembly of FIG. 1 in a slab having the sliding egress cord door in an opened position and the cover in the covered position.

Each sliding egress cord door 22 can move from the closed position that is shown in FIG. 1 to an open position as shown in FIG. 3 to uncover one of openings 21. For example, each sliding egress cord door 22 can be a panel that fits in tracks on an inside of cover body 18 to allow for the panel to slide and the panel can be biased to cover the one of openings 21 by a biasing member such as a spring.

Figure 6:
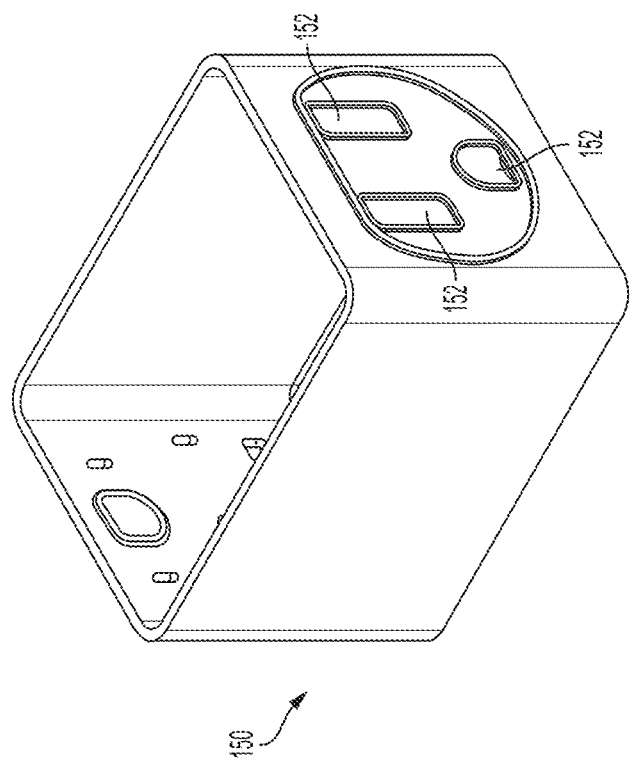
FIG. 6 is a gasket seal for a pre-receptacle.

Referring to FIGS. 3 and 4, a receptacle housing 100 is housed in cover 12 and concrete/ground box 16. Receptacle housing 100 has back to back fixed pre-receptacles 102 with wire leads (not shown) and covered contacts (not shown). Alternatively, receptacle housing 100 can have only one or more than two fixed pre-receptacles 102 with wire leads and covered contacts. Referring to FIG. 6, pre-receptacles 102 can each have a silicone cover 150 such that the contacts are covered and water resistant. Silicone cover 150 can have flaps 152 that are urged open when a plug 300 (FIG. 5) is inserted into one of pre-receptacles 102 and flaps 152 can be biased to close when plug 300 is removed to be water resistant. Receptacle housing 100 can be connected to concrete/ground box 16 by fasteners and/or a support structure. Each of pre-receptacles 102 is aligned with one of openings 21 through cover 12. As shown in FIG. 3, each sliding egress cord door 22 can move from the closed position that is shown in FIG. 1 to an open position as shown in FIG. 3 to uncover a portion of one of openings 21 uncovering a portion of one of pre-receptacles 102. Alternatively, receptacle housing 100 can house other outlets or connectors in addition to or instead of pre-receptacles 102, for example, USB ports, phone lines, cables and any combination thereof.

Referring to FIG. 4, an extendable rail system 30 has a receptacle portion 32 attached to receptacle housing 100. Extendible rail system 30 also has a cover portion 34 that is attached to an inside of cover 12. Receptacle portion 32 has rails 36, 38 on opposite sides of receptacle housing 100 that mate with rails 40, 42 of cover portion 34 that extend from the inside of cover 12 so that rails 40, 42 of cover portion 34 are slidable along rails 36, 38 of receptacle portion 32. Each of rails 36, 38 of receptacle portion 32 can have a projection or mechanical stop at an end that is opposite concrete/ground box 16 and each of rails 40, 42 of cover portion 34 can have a projection or mechanical stop at an end that is free and opposite an end that connects to the inside of cover 12. The mechanical stop of rails 36, 38 can abut the mechanical stop of rails 40, 42 to maintain a connection between cover 12 and receptacle housing 100 when cover 12 is in an uncovered position as shown in FIG. 4. Alternatively, rails 36, 38 can instead be a first single rail and rails 40, 42 can instead be a second single rail that mates with the first single rail.

In use, pedestal 10 can be installed in a slab on grade or earth application, for example, concrete/ground box 16 is installed in slab 200 shown in FIGS. 3-5. Slab 200 is a concrete slab. A user can insert their fingers in grooves 20 to lift cover 12 in a direction A shown in FIG. 3 to move cover 12 from a covered position as shown in FIG. 3 to an uncovered position as shown in FIG. 4 allowing access to receptacle housing 100. A plug 300 and cord 302 can be plugged into one of pre-receptacles 102 when cover 12 is in the uncovered position. Cover 12 can then move in a direction B from the uncovered position shown in FIG. 4 to the covered position as shown in FIG. 5. As cover 12 moves in direction B from the uncovered position shown in FIG. 4 to the covered position as shown in FIG. 5 one of sliding egress cord doors 22 can move in direction A to uncover a portion of one of openings 21 to a partially open position as shown in FIG. 5 allowing cover 12 to return to the covered position while plug 300 and cord 302 are maintained plugged into the one of pre-receptacles 102 and the one of sliding egress cord doors 22 closes an open gap and rests on cord 302 when cover 12 is in the covered position. The one of sliding egress cord doors 22 can be urged against the plug 300 and/or cord 302 when cover 12 is in the covered position by the bias applied by, for example, a spring, to bias the one of sliding egress cord doors 22 to cover the one of openings 21. Cover 12 may be configured to move in direction B from the uncovered position shown in FIG. 4 to the covered position as shown in FIG. 5 by falling back into place by its own weight. Cover mounting flange 14 has a skirt 44 that is an integral part of cover mounting flange 14. Skirt 44 has a diameter that is smaller than cover 12 that aligns cover 12 in the covered position on cover mounting flange 14. Slab 200 has an electrical conduit 400 that is a tube used to protect and route electrical wiring in slab 200 to pedestal 10. Electrical conduit 400 connects to concrete/ground box 16 through the NPT hub. Electrical conduit 400 has electrical wiring that passes from electrical conduit 400 into concrete/ground box 16 through the NPT hub to conduct electrical current to pre-receptacles 102 to supply plug 300 and cord 302 with electrical current.

Figure 7:
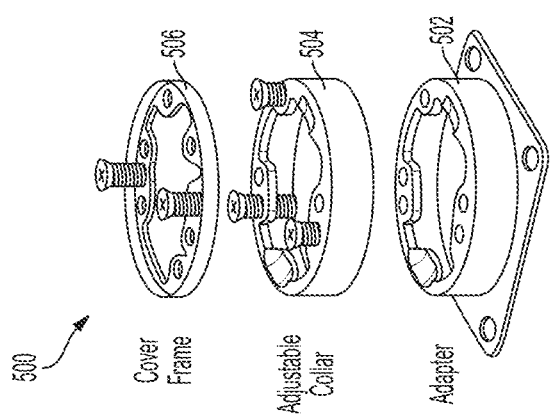
FIG. 7 is a box top cover assembly of a floorbox that has a post pour adjustment.

Accordingly, the egg shaped round shape of cover 12 can shed water and bear the weight of someone standing on it. Cover 12 would be pulled up by the user, cover 12 has a mechanical stop, for example, as described herein. Cover 12 rises high enough for the user to see a receptacle face of pre-receptacles 102 to plug in the load of plug 300 and cord 302. Cover 12 has sliding egress cord doors 22 that are each a secondary gasketed cover which will slide up to accommodate the exiting cord 302 through openings 21. Pre-receptacles 102 can be prewired receptacle(s) that have wire leads which are fed thru electrical conduit 400 embedded in the concrete of slab 200 or earth. The wire lead would be connected to a load side of a ground fault circuit interrupter ("GFCI") receptacle for protection. It could also be connected to a GFCI circuit breaker, similar to the requirement for a wet location receptacle. Cover 12 and cover mounting flange 14 will mount to concrete/ground box 16 that is a cast iron floorbox with threaded conduit hubs, for example, the NPT hub. Using cast iron will allow pedestal 10 to be used in all markets; also concrete/ground box 16 will be allowed to be installed in a slab on grade or an earth application. The threaded NPT hubs of concrete/ground box 16 will allow it to be used with all types of electrical conduits. Cover 12 and cover mounting flange 14 mount to concrete/ground box 16 via multiple mounting holes to maintain a water tight seal and for versatility of the orientation of cover 12 installation. Concrete/ground box 16 and cover 12 can be sold separately and then assembled by the user. Concrete/ground box 16 can have a concrete installation cover to rest on slab 200 and external adjustable mounting screws so that the concrete installation cover can be adjusted, for example, to be level on slab 200. As shown in FIG. 7, concrete/ground box 16 can have a box top cover assembly 500 for a post pour adjustment. Box top cover assembly 500 has an adapter 502, adjustable collar 504 and cover frame 506. Adapter 502 connects to concrete/ground box 16, adjustable collar 504 connects to adapter 502 and cover frame 506 connects to adjustable collar 504. Box top cover assembly 500 can be adjusted on concrete/ground box 16 so that cover 12 can be level on slab 12.

Pedestal 10 advantageously will allow access to convenience power independent of a wall or column. Receptacle housing 100 with pre-receptacles 102 can have long wire leads which will run through electrical conduit 400 to be terminated to the load side of a GFCI receptacle or terminated in a junction box in which the wires are feed from a GFCI circuit breaker. Concrete/ground box 16 can have a low profile box that can be installed in an outdoor concrete balcony or patio with a pour thickness of 4 inches. Cover mounting flange 14 will allow cover 12 to be mounted in any direction. The unique design of cover 12 will have a high load capacity and can be available in multiple finishes. Concrete/ground box 16 and cover 12 with cover mounting flange 14 can be sold separately, concrete/ground box 16 can be installed in the rough in phase and cover 12 with cover mounting flange 14 can be installed at trim-out.

A concrete/ground box 16 with a low profile cover 12 with cover mounting flange 14 of pedestal 10 can be installed in a concrete balcony and the earth; surrounded by pavers, natural stone, concrete, gravel or grass. Field conduit is installed into the NPT hub of concrete/ground box 16. Cover 12 with cover mounting flange 14 mounts to concrete/ ground box 16 and slides up allowing access to receptacle housing 100 with pre-receptacles 102 underneath. When cover 12 slides down sliding egress cord doors 22 allow plug 300 with cord 302 or cable to exit from openings 21. Sliding egress cord doors 22 provide protection from water. The prewired receptacles of receptacle housing 100 with pre-receptacles 102 will need to be wired to the load side of a near by GFCI receptacle or GFCI circuit breaker. Receptacle housing 100 with pre-receptacles 102 can have a NEMA 3R Rating Extra Heavy Duty and comply to N2007 NEC 406.9 (A) (B) requirements.

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

PARTS LIST low profile outdoor pedestal assembly 10
cover 12
cover mounting flange 14
concrete/ground box 16
cover body 18
grooves 20
openings 21
sliding egress cord door 22
flange body 24
holes 26
fastener 28
extendable rail system 30
receptacle portion 32
cover portion 34
rails 36, 38
rails 40, 42
skirt 44
receptacle housing 100
fixed pre-receptacle 102
silicone cover 150
flaps 152
slab 200
plug 300
cord 302
electrical conduit 400
box top cover assembly 500
adapter 502
adjustable collar 504
cover frame 506

What is claimed is:

1. A pedestal assembly comprising:
 a cover having a half egg shape, dome shape, or hemispheroid shape, the cover having a height and an outer perimeter, the cover having a cover body, and the cover body having at least one opening;
 at least one door at is movable between a closed position to cover the at least one opening and an open position to uncover the at least one opening:
 a box to be used in concrete or ground connected to the cover; and
 a receptacle housing having one or more pre-receptacles housed in between the cover and the box, the cover being movable from a covered position covering the receptacle housing to an uncovered position allowing access to the receptacle housing, the one or more pre-receptacles being configured so that a plug can be plugged in horizontally, the height of the cover being sized so that the cover can cover the receptacle housing while the outer perimeter contacts the box in the covered position, and the cover moves vertically away from the box from the covered position to the uncovered position and vertically towards the box from the uncovered position to the covered position.

2. The pedestal assembly of claim 1, wherein the at least one door is at least one sliding egress cord door covering the opening.

3. The pedestal assembly of claim 2, wherein the at least one opening is two openings on opposite sides of the cover body, and wherein the at least one sliding egress cord door is two sliding egress cord doors with one sliding egress cord door covering one of the two openings and another sliding egress cord door covering another of the two openings.

4. The pedestal assembly of claim 3, wherein the receptacle housing has two back to back fixed pre-receptacles each with wire leads and covered contacts, and wherein one of the two back to back fixed pre-receptacles is aligned with one of the two openings of the cover and another of the two back to back fixed pre-receptacles is aligned with another of the two openings of the cover.

5. The pedestal assembly of claim 2, wherein the at least one sliding egress cord door is biased to cover the at least one of opening.

6. The pedestal assembly of claim 5, wherein the at least one sliding egress cord door can be urged against a plug and/or a cord when the cover is in the covered position by the at least one sliding egress cord door being biased to cover the at least one of opening.

7. The pedestal assembly of claim 1, wherein the cover body has a plurality of grooves that are each sized to be gripped by fingers of a user on a top portion of the cover.

8. A pedestal assembly comprising:
 a cover having a half egg shape, dome shape, or hemispheroid shape, the cover having a height and an outer perimeter;
 a box to be used in concrete or ground connected to the cover; and
 a cover mounting flange shaped complimentary to an outer perimeter of the cover that connects around an opening in the box that faces the cover; and
 a receptacle housing having one or more pre-receptacles housed in between the cover and the box, the cover being movable from a covered position covering the receptacle housing to an uncovered position allowing access to the receptacle housing, the one or more pre-receptacles being configured so that a plug can be plugged in horizontally, the height of the cover being sized so that the cover can cover the receptacle housing while the outer perimeter contacts the box in the covered position, and the cover moves vertically away from the box from the covered position to the uncovered position and vertically towards the box from the uncovered position to the covered position.

9. The pedestal assembly of claim 8, wherein the cover mounting flange has a plurality of holes through a flange body so that each of the plurality of holes receives one of a plurality of fasteners.

10. The pedestal assembly of claim 9, wherein the plurality of fasteners are each 60 degrees apart.

11. The pedestal assembly of claim 8, wherein the cover mounting flange has a skirt that is an integral part of the cover mounting flange, and wherein the skirt has a diameter that is smaller than the cover to align the cover in a covered position.

12. The pedestal assembly of claim 1, wherein the receptacle housing has two back to back fixed pre-receptacles each with wire leads and covered contacts.

13. The pedestal assembly of claim 1, further comprising an extendable rail system having a receptacle portion attached to the receptacle housing and a cover portion that is attached to the cover, wherein the receptacle portion has one or more rails that mate with one or more rails of the cover portion that extend from the cover so that the one or more rails of the cover portion are slidable along the one or more rails of the receptacle portion.

14. The pedestal assembly of claim 1, wherein the box is cast iron.

15. The pedestal assembly of claim 1, wherein the cover is made of materials selected from the group comprising a cast aluminum construction, stainless steel cover construction, and any combinations thereof.

16. The pedestal assembly of claim 1, wherein the two pre-receptacles have a silicone cover such that the covered contacts are covered and water resistant.

17. The pedestal assembly of claim 1, wherein the box has a box top cover assembly for a post pour adjustment having an adapter, an adjustable collar and a cover frame, and wherein the adapter connects to the box, the adjustable collar connects to the adapter and the cover frame connects to the adjustable collar.

18. A pedestal assembly comprising:
a cover having a half egg shape dome shape, or hemispheroid shape, the cover having a height and an outer perimeter;
a box to be used in concrete or ground connected to the cover; and
a receptacle housing having one or more pre-receptacles housed in between the cover and the box, the cover being movable from a covered position covering the receptacle housing to an uncovered position allowing access to the receptacle housing, the one or more pre-receptacles being configured so that plug can be plugged in horizontally, the height of the cover being sized so that the cover can cover the receptacle housing while the outer perimeter contacts the box in the covered position, and the cover moves vertically away from the box from the covered position to the uncovered position and vertically towards the box from the uncovered position to the covered position, wherein the cover moves from the uncovered position to the covered position by the weight of the cover.

19. A pedestal assembly comprising:
a cover having a half egg shape, dome shape, or hemispheroid shape, the cover having a height and an outer perimeter;
a box to be used in concrete or ground connected to the cover; and
a receptacle housing having one or more pre-receptacles housed in between the cover and the box, the cover being movable from a covered position covering the receptacle housing to an uncovered position allowing access to the receptacle housing, the one or more pre-receptacles being configured so that a plug can be plugged in horizontally, the height of the cover being sized so that the cover can cover the receptacle housing while the outer perimeter contacts the box in the covered position, and the cover moves vertically away from the box from the covered position to the uncovered position and vertically towards the box from the uncovered position to the covered position, wherein the box connects to an electrical conduit in a slab.

20. A pedestal assembly comprising:
a cover having a half egg shape, dome shape, or hemispheroid shape;
a box to be used in concrete or ground connected to the cover;
a receptacle housing having one or more pre-receptacles housed in between the cover and the box, the cover being movable from a covered position covering the receptacle housing to an uncovered position allowing access to the receptacle housing; and
an extendable rail system having a receptacle portion attached to the receptacle housing and a cover portion that is attached to the cover, wherein the receptacle portion has one or more rails that mate with one or more rails of the cover portion that extend from the cover so that the one or more rails of the cover portion are slidable along the one or more rails of the receptacle portion, wherein each of the one or more rails of the receptacle portion have a projection or mechanical stop at an end that is opposite the box and each of the one or more rails of the cover portion have a projection or mechanical stop at an end that is free and opposite an end that connects to an interior of the cover so that the mechanical stop of the one or more rails of the receptacle portion abut the projection or mechanical stop of the one or more rails of the cover portion to maintain a connection between the cover and the receptacle housing when the cover is in an uncovered position.

* * * * *